June 24, 1958 E. M. CLIFTON 2,840,331
TREE HOLDER
Filed Feb. 15, 1954

United States Patent Office 2,840,331
Patented June 24, 1958

2,840,331

TREE HOLDER

Enoch Martin Clifton, Portland, Oreg.

Application February 15, 1954, Serial No. 410,184

1 Claim. (Cl. 248—48)

This invention relates to improvements in stands or holders for Christmas trees and the like and among its principal objects are to provide a tree holder having a base member made of two intersecting horizontal strips and socket-forming elements made of vertical strips slidably adjustable lengthwise of the base strips and lockable thereto to self-center and tightly seat a tree butt or the like therein; to provide a holder of this character wherein all of said strips are of uniform width and thickness for convenient assembly into a compact bundle for packaging, storing or shipping.

The foregoing and other objects will appear as my invention is more fully hereinafter described in the following specification, illustrated in the accompanying drawing, and finally pointed out in the appended claims.

Figure 1:
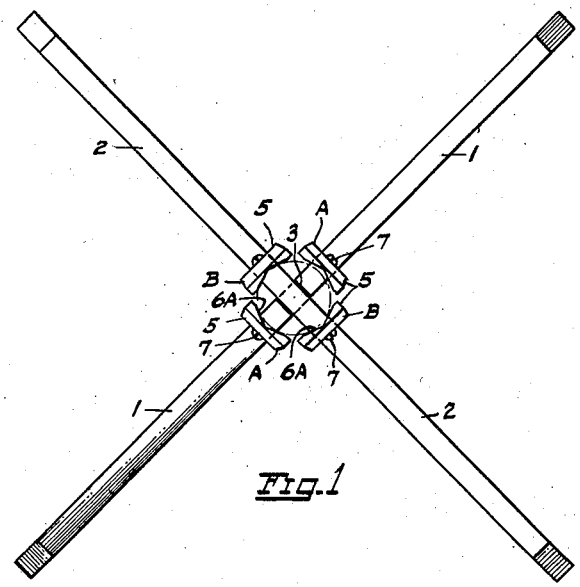
Figure 1 is a top plan view of a tree holder made in accordance with my invention.

Referring now more particularly to the drawing:

The base of the holder comprises two strips of rigid material indicated by reference numerals 1 and 2 of equal length, height and thickness, rectangular in cross section and which may be made of wood or other suitable material. The strips are secured to each other at their centers by a recess 3 formed in and extending downwardly from the top surface of the strip 1 and embracing that portion of the strip 2 above a recess 4 formed in and extending upwardly from its bottom surface. The recesses are of sufficient depth to permit the bottom surfaces of both strips to be in the same horizontal plane.

The base-forming strips thus assembled form a solid support for four identical socket-forming members indicated at 5 and made of the same strip material as that of the base strips. Said members 5 are bifurcated as at 6 at their bottom ends and thereby slidable lengthwise of their respective base strips 1 or 2 into adjusted positions to accommodate various diameters of tree butts such as, for example, the one shown in broken lines in Figures 1 and 2. The inner face of each member 5 is recessed throughout its length as shown in Figure 1 to provide outwardly diverging surfaces 6A for automatically guiding the tree butt into a vertical position and also for centering it with respect to the socket and the intersection of the base strips when the members are secured to the tree butt by means of wood screws or the like as indicated at 7.

When all of the socket-forming members are thus secured to the butt of a tree, they securely hold the tree from tipping in any direction but can be readily removed from the base strips along with the tree by lifting the tree upwardly.

Figure 2:
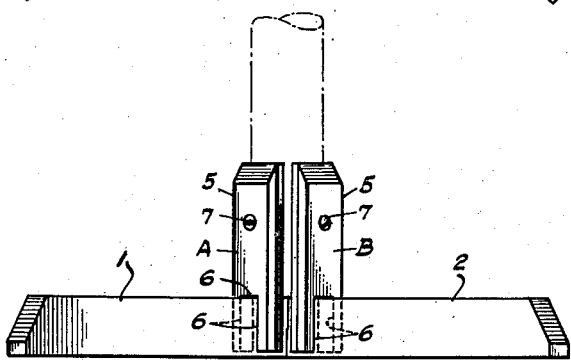
Figure 2 is a side view of Figure 1.

For convenience in describing the tree-supporting function of the socket-forming members I will refer to them as two pairs which I have indicated by the letters A and B in Figure 1. The firm grip of the bifurcated ends of one pair, for example, A on their respective base strip prevents any tilting of that pair transversely of the base strip and also any tilting of the other pair B in a direction lengthwise of its base strip, since both pairs are interlocked by their attachment to the tree butt through the medium of the screws 7 or other fastening elements as aforesaid.

Figure 3:
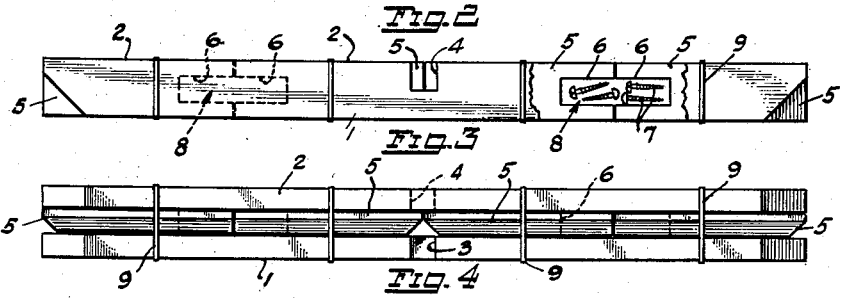
Figure 3 is a top plan view of the holder in knocked down form with its various parts stacked and tied for wrapping or packaging.
Figure 4:
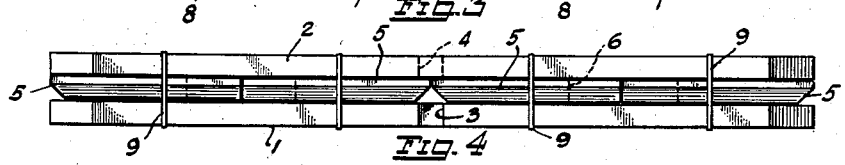
Figure 4 is a side view of Figure 3.

To enable the base-forming strips and the socket-forming members to be neatly and compactly stacked for wrapping or packaging as shown in Figures 3 and 4, each socket-forming member should be one-fourth the length of the base-forming strips. In stacking the base strips and socket-forming members the latter are arranged with their bifurcated ends abutting one another to form, along with the base strips above and below them, a closed receptacle 8 for the fastening screws 7 as best shown in Figure 3. Any suitable binding means 9 such as rubber bands or wrapping string may be used for securing the strips and socket-forming members together in package form as shown.

While I have shown a particular form of embodiment of my invention I am aware that many minor changes therein will readily suggest themselves to others skilled in the art without departing from the spirit and scope of the invention.

Having thus described my invention what I claim as new and desire to protect by Letters Patent is:

A knockdown holder for Christmas trees and like objects, comprising a base made of two indentical strips of rigid material of rectangular shape in cross section, crossed and detachably interconnected at their centers so as to rest on one of their narrow sides, two pairs of vertically disposed identical socket-forming members each bifurcated at its bottom end and thereby engaged with and vertically stabilized by the top surface of the other narrow side and two vertical sides of said strips and a wood screw extending through the top end of each socket-forming member for securing the same to a tree butt vertically disposed centrally of the socket-forming members whereby the resultant interlocked opposed relationship of the members of one pair and their said engagement with the sides of their respective base strip will prevent tipping of the tree butt in the direction of the line of opposition of the members of the other pair.

References Cited in the file of this patent

UNITED STATES PATENTS

| | | |
|---|---|---|
| 573,225 | Kurtz | Dec. 15, 1896 |
| 1,607,358 | Moran | Nov. 16, 1926 |
| 1,721,980 | Wardell | July 23, 1929 |
| 1,792,307 | Jensen | Feb. 10, 1931 |
| 2,250,361 | Cullinan | July 22, 1941 |
| 2,410,227 | Mathews | Oct. 29, 1946 |
| 2,630,287 | Trogdon | Mar. 3, 1953 |